(12) United States Patent
Cook et al.

US006367141B1

(10) Patent No.: US 6,367,141 B1
(45) Date of Patent: Apr. 9, 2002

(54) METHOD OF INSERTING A PISTON ASSEMBLY INTO A CYLINDER OF AN INTERNAL COMBUSTION ENGINE

(75) Inventors: James A. Cook, Delphi; Brad A. Moore, Frankfort; Kevin R. Shaffer, West Lafayette; James L. Thien, Logansport; Robert L. Walters, Lafayette, all of IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/606,307

(22) Filed: Jun. 29, 2000

(51) Int. Cl.⁷ ............................................... B23Q 17/00
(52) U.S. Cl. ................ 29/407.1; 29/407.05; 29/407.09; 29/464; 29/888.044; 269/71
(58) Field of Search ................... 29/888.01, 888.044, 29/407.01, 407.05, 407.09, 407.1, 464, 702, 703, 705, 709, 712, 714, 271, 281.5, 434; 269/71

(56) References Cited

U.S. PATENT DOCUMENTS 3,952,393 A * 4/1976 Van Ravenswaay et al. ..................... 29/888.044
4,794,690 A * 1/1989 Yamanaga et al. ............. 29/709
4,887,341 A * 12/1989 Sakimoro et al. ............. 29/464
5,974,650 A * 11/1999 Kawabata et al. ......... 29/281.5
6,047,472 A * 4/2000 Koch et al. ............... 29/888.01
6,138,340 A * 10/2000 Yoshida ..................... 29/281.5

FOREIGN PATENT DOCUMENTS

JP          401281832 A   * 11/1989    ............ 29/888.044
JP           11033847 A   *  2/1999

* cited by examiner

Primary Examiner—David P. Bryant
Assistant Examiner—Jermie E. Cozakt
(74) Attorney, Agent, or Firm—Andrew M. Calderon

(57) ABSTRACT

A method of inserting a piston assembly into a cylinder of an engine block. The method eliminates the need for a technician to individually lift and insert the piston assemblies into the respective cylinders. The method for inserting the piston assembly into the cylinder aligns the piston assembly with the cylinder and inserts the piston assembly into the cylinder by pivoting the piston assembly from an upright position to a horizontal position, and inserting the piston assembly into the cylinder of the engine block.

21 Claims, 7 Drawing Sheets

METHOD OF INSERTING A PISTON ASSEMBLY INTO A CYLINDER OF AN INTERNAL COMBUSTION ENGINE

TECHNICAL FIELD

This invention relates generally to a method of inserting a piston assembly into a cylinder of an internal combustion engine, and more particularly to a method of inserting a piston assembly into a cylinder of an internal combustion engine using a piston inserting machine.

BACKGROUND ART

Internal combustion engines are complex mechanisms which include a vast array of components that need to be assembled in a very precise manner. The proper assembly of the components of the internal combustion engine is of the utmost importance since it ensures that the engine will work within its intended design parameters, i.e., in the most efficient manner.

The assembly of these components is both time consuming and arduous, even for the most experienced technician. This is mainly due to the fact that the technician manually performs many of the assembly steps, even those steps which require lifting heavy and awkward components such as piston assemblies. These steps are performed manually despite the fact that they lead to higher manufacturing and production costs.

By way of example, the internal combustion engine may include many components such as cylinder liners, piston assemblies, crankshafts, camshafts, valves and the like. In order to correctly assemble all of these components, the technician typically performs several assembly steps on both the engine block as well as many of the engine components. These steps may include lining the cylinders with cylinder liners and then assembling a piston assembly. The piston assembly typically includes connecting a connecting rod to the piston (via a pin) and placing rings within grooves of the piston. Thereafter the technician may place the piston and rings within a piston ring compressor. The piston ring compressor compresses the piston rings within the grooves of the piston so that the piston assembly can be properly inserted within the cylinder.

Once the piston is properly inserted within the piston ring compressor, the technician manually lifts the piston assembly and aligns it with the cylinder. After the technician aligns the assembly with the cylinder, it is manually inserted (connecting rod first) into the cylinder and the connecting rod is then connected to the crankshaft.

However, a single technician cannot insert the piston assembly entirely into the cylinder. Accordingly, a second technician is positioned on a rear side of the internal combustion engine and continues the insertion process. This not only ensures that the piston assembly is completely inserted within the cylinder, but equally ensures that the connecting rod is properly aligned with and connected to the crankshaft. These same steps must be performed upwards of eight or more times for each engine block, depending on the number of cylinders within the engine block.

As is known, however, some internal combustion engines are very large such as internal combustion engines which power, for example, power generation sets, earth working machinery, paving machinery, load transfer carrying machinery and the like. Due to the size of these internal combustion engines, the piston assemblies as well as other components of such engines must likewise be larger in size. This results in a piston assembly which may weigh upwards of 25 kilograms (approximately fifty-five (55) pounds) or more.

When the piston assembly is of such a size and weight it may be difficult for the technician to manually lift the piston assembly. This is especially true when the piston ring compressor assembly is placed about the crown of the piston, which adds further weight to the entire assembly. Due to the weight of the piston assembly and compressor, it may be difficult for the technician to align and insert the piston assembly into the cylinder. These problems are only increased by the fact that the above assembly steps must be performed countless times during a single workday.

In order to solve these problems, current methods of assembling an internal combustion engine include using more than one technician to lift the piston assembly and perform the aligning and inserting steps. Alternatively, it is known that several technicians may take turns lifting the piston assembly and performing the aligning and inserting steps. In either case, these solutions are not very efficient, and typically lead to higher manufacturing and production costs. Of course, these higher manufacturing and production costs are then passed along to the consumer by raising the cost of the machine which utilizes such engine.

The present invention is directed to overcoming one or more of the problems as set forth above.

DISCLOSURE OF THE INVENTION

In one aspect of the present invention a method of inserting a piston assembly into a cylinder of an engine block is provided. This method includes inserting a piston assembly into a barrel assembly and rotating the barrel assembly from a vertical position to a horizontal position. The barrel assembly is then aligned with the cylinder of the engine block. Thereafter, the piston assembly is inserted into the cylinder of the engine block.

In another aspect of the present invention, a method of inserting a piston assembly into a cylinder of an engine block using a piston insertion machine is provided. The piston insertion machine includes a barrel assembly adapted for housing the piston assembly therein, and which is moveable by compression components. The method includes inserting the piston assembly into the barrel assembly, and rotating the barrel assembly from a vertical position to a horizontal position. The barrel assembly is also aligned with the cylinder of the engine block. The barrel assembly is extended to the cylinder and the piston assembly is then inserted into the cylinder of the engine block.

BEST MODE FOR CARRYING OUT THE INVENTION

Figure 1:
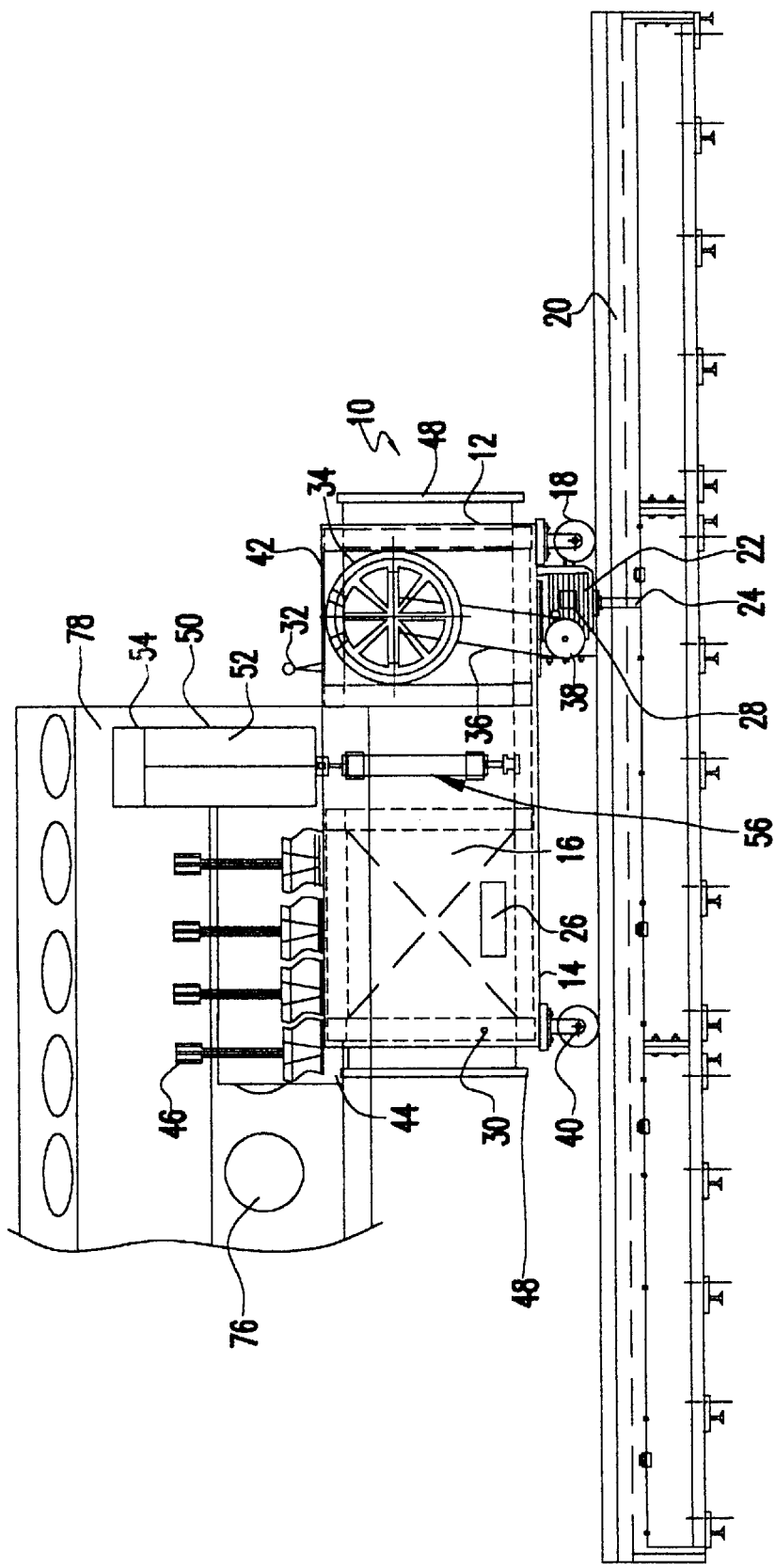
FIG. 1 shows a diagrammatic front plan view of a piston insertion machine which is used in accordance with the method of the present invention.

FIG. 1 is a diagrammatic front plan view of the piston insertion machine 10 which is used in the present invention is shown. The piston insertion machine 10 includes a frame 12 (e.g., cart) having a bottom surface 14 and an inner compartment 16. Wheels 18 extend from the bottom surface 14 of the frame 12, and ride along tracks 20 that are aligned with and parallel to a front facing surface 100a of an engine block 78.

A motor 22 is located on the frame 12 and connects to a rack and pinion gear 24, where the rack is located along the track 20. The motor 22 may also be directly connected to the wheels 18 via the gear 24, and the gear 24 may be set to any gear ratio depending on the particular design of the piston insertion machine 10. A controller 26 and an encoder 28 are also provided on the frame 12. A position sensor 30 is positioned on the frame 12 and is facing the engine block 78. The position sensor 30 is preferably a laser spotter.

The piston insertion machine 10 also includes a joystick 32 or other control mechanism. The joystick 32 is preferably located on the frame 12. A drive wheel 34 is located on the frame 12 which is in communication with the motor 22 via a drive belt 36 and a pulley 38 mechanism.

Still referring to FIG. 1, the piston insertion machine 10 also includes an interlock system 40. The interlock system 40 is preferably an electrical interlock system 40, but may also be a mechanical locking system (the location of the interlock system 40 is not critical to the understanding of the present invention). The piston insertion machine 10 further includes a base 42 partially surrounded by a shroud 44. The base 42 stores piston assemblies 46 thereon. A guard 48 is provided on the frame 12 of the piston insertion machine 10.

Figure 2:
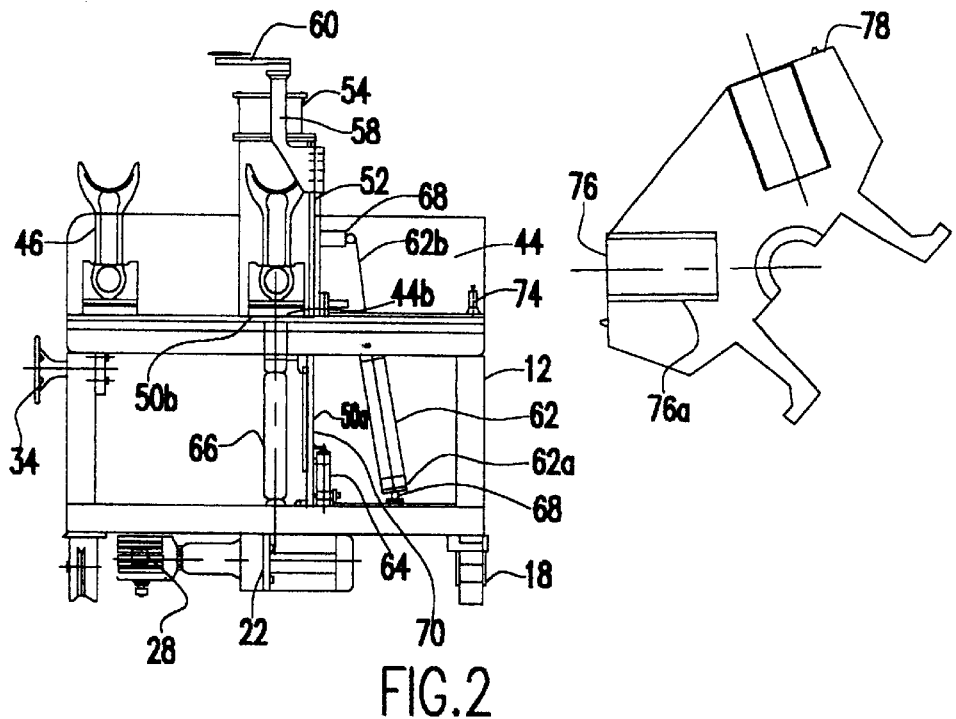
FIG. 2 shows a diagrammatic side plan view of the piston insertion machine having a piston assembly located within a barrel assembly of the present invention.

FIG. 1 further shows a barrel assembly 50 located on the base 42. In FIG. 1, the barrel assembly 50 is in a upright position, substantially in alignment with the piston assemblies 46. The barrel assembly 50 includes doors 52 and a piston ring compressor 54. (FIG. 2 shows additional features of the barrel assembly 50.) The doors 52 can be positioned in either an opened or closed position, depending on the particular stage of operation.

The barrel assembly 50 is positionable via a positioning mechanism (e.g., fluid system) 56. The positioning mechanism 56 may be for example, a hydraulic or other fluid system; however, a "jackscrew" or other electrical or mechanical system is also contemplated for use with the present invention.

FIG. 2 shows a diagrammatic side plan view of the piston insertion machine 10 with the barrel assembly 50 in the upright position, and a piston assembly 46 inserted therein. The barrel assembly 50 includes a barrel frame 50a and a base 50b. The barrel frame 50a and the base 50b in addition to the frame 12 support the several components of the positioning mechanism 56 (and the barrel assembly 50). The barrel assembly 50 also includes an outward extending arm 58 connected to a positioning arm 60.

Still referring to FIG. 2, the positioning mechanism 56 includes components 62, 64 and is associated with an inserting mechanism depicted as component 66, each providing a separate movement of either the barrel assembly 50 or the piston assembly 46. The component 62 is pivotally connected to the frame 12 at a first end 62a and the barrel frame 50a at a second end 62b via a swivel connection 68. The component 64 is connected to a first side 70 of the barrel frame 50a, while the component 66 is connected to the base 50b on a second side 72 of the barrel frame 50a. Shock absorbers 74 are located throughout the compartment 16 of the piston insertion machine 10. The shock absorbers 74 may also be provided at other locations on the frame 12.

Figure 3:
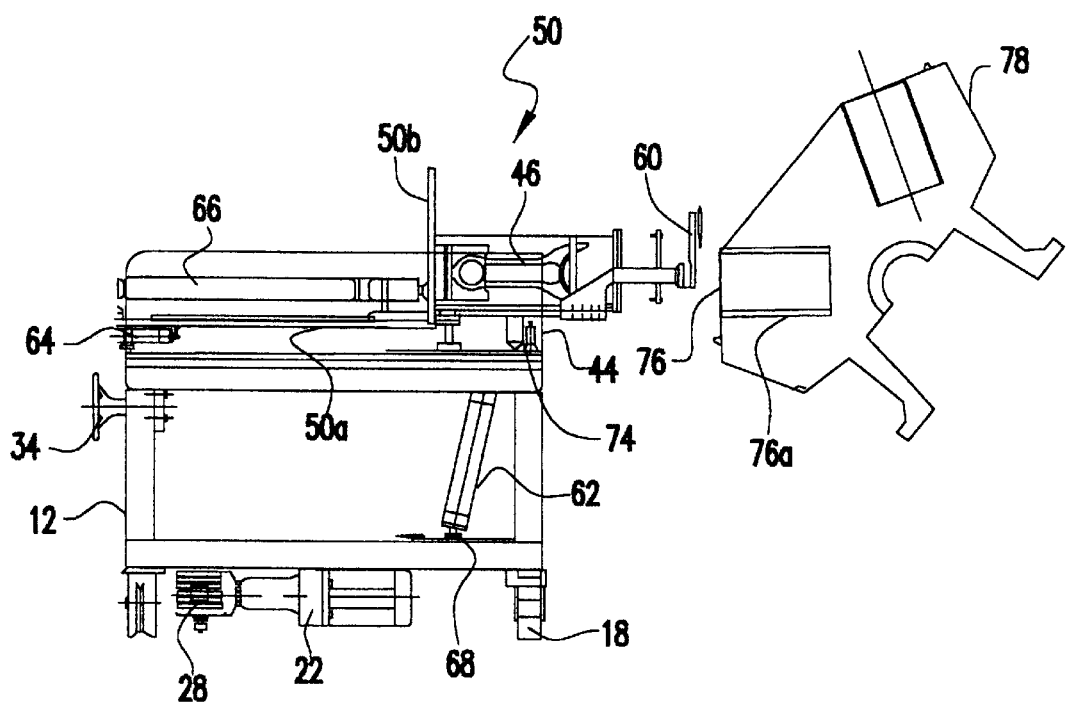
FIG. 3 shows a diagrammatic side plan view of the piston insertion machine when the barrel assembly is in a horizontal position.

FIG. 3 shows a diagrammatic side plan view of the piston insertion machine 10 when the barrel assembly 50 is in the horizontal position. In FIG. 3, the component 62 is in a retracted position, and the component 64 and the component 66 are in a horizontal position.

Figure 4:
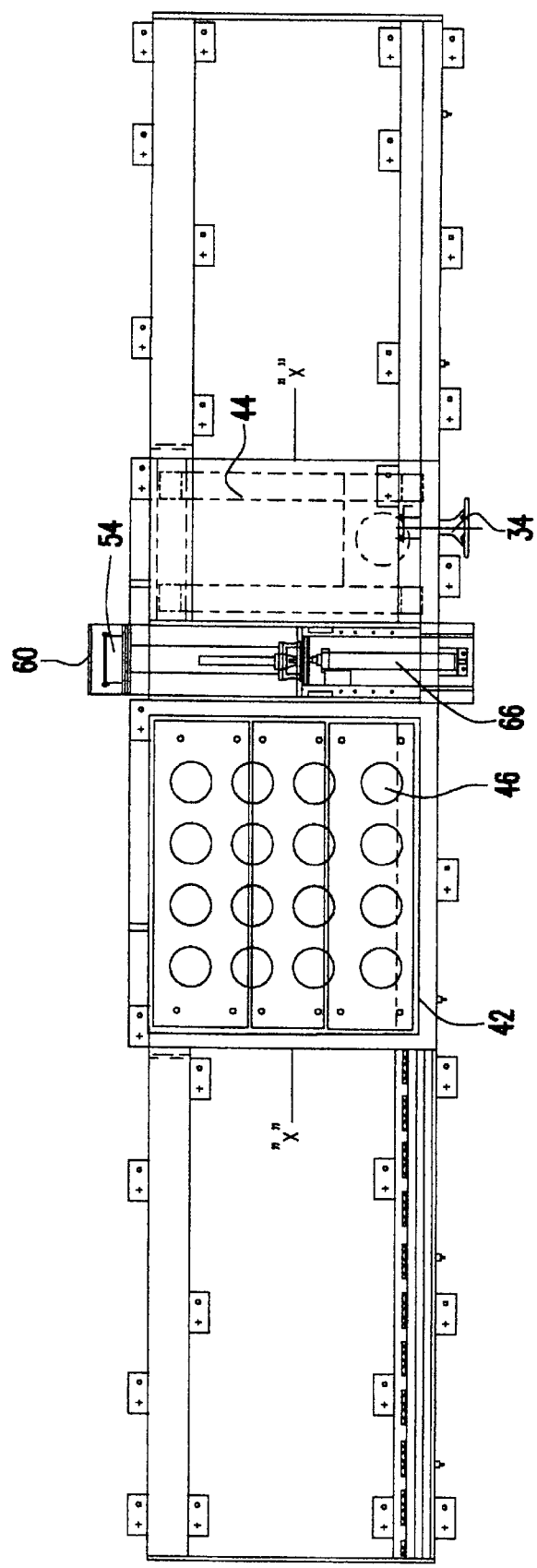
FIG. 4 shows a diagrammatic top plan view of the piston insertion machine when the barrel assembly is in the horizontal position.

FIG. 4 shows a top plan view of the piston insertion machine 10 when the barrel assembly 50 is in the horizontal position. This view is shown to better illustrate the position of the barrel assembly 50 with relation to the base 42 of the piston insertion machine 10 as well as the cylinders 76 of the engine block 78. In particular, the barrel assembly 50 is substantially perpendicular to a length-wise axis "X" of the base 42.

In the horizontal position as shown in FIG. 4, the barrel assembly 50 is at a substantially same height as the cylinders 76 of the engine block 78. FIG. 4 further shows the positioning arm 60 which is preferably U-shaped with a diameter larger than the barrel assembly 50 or the piston assembly 46.

Figure 5:
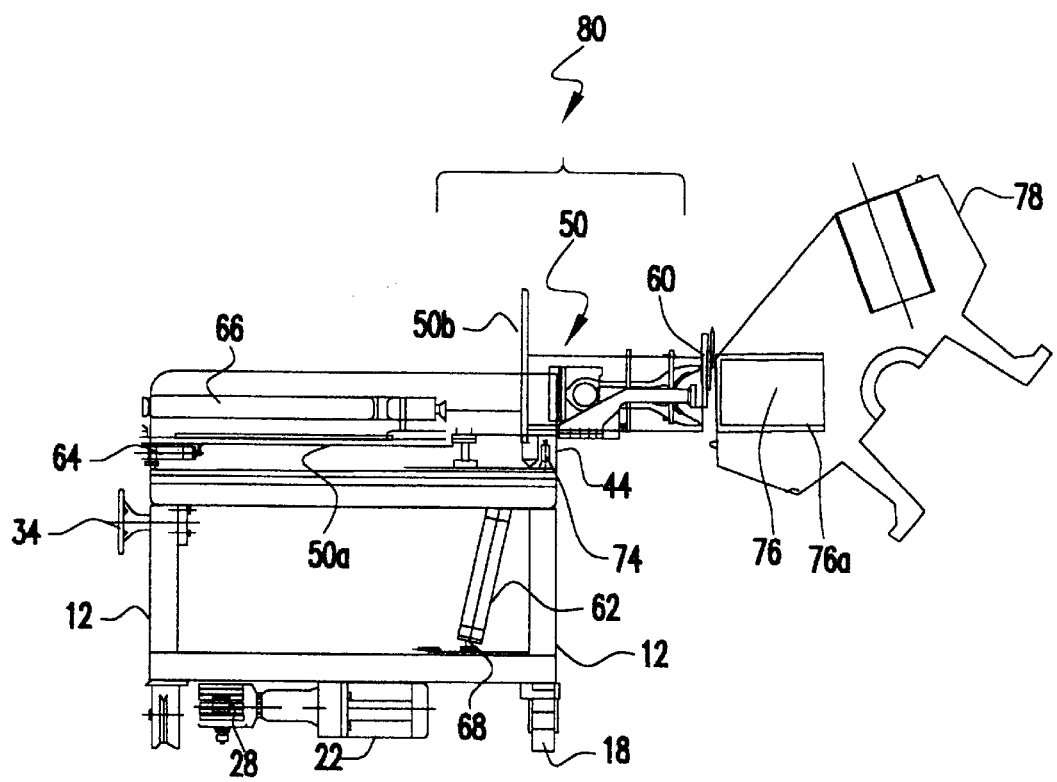
FIG. 5 shows a diagrammatic side plan view of the piston insertion machine when the barrel assembly is in an extended horizontal position.

FIG. 5 shows a diagrammatic side plan view of the piston insertion machine 10 when the barrel assembly 50 is in an extended horizontal position 80. In this position, the positioning arm 60 is in contact with the engine block 78 or a cylinder liner 76a.

Figure 6:
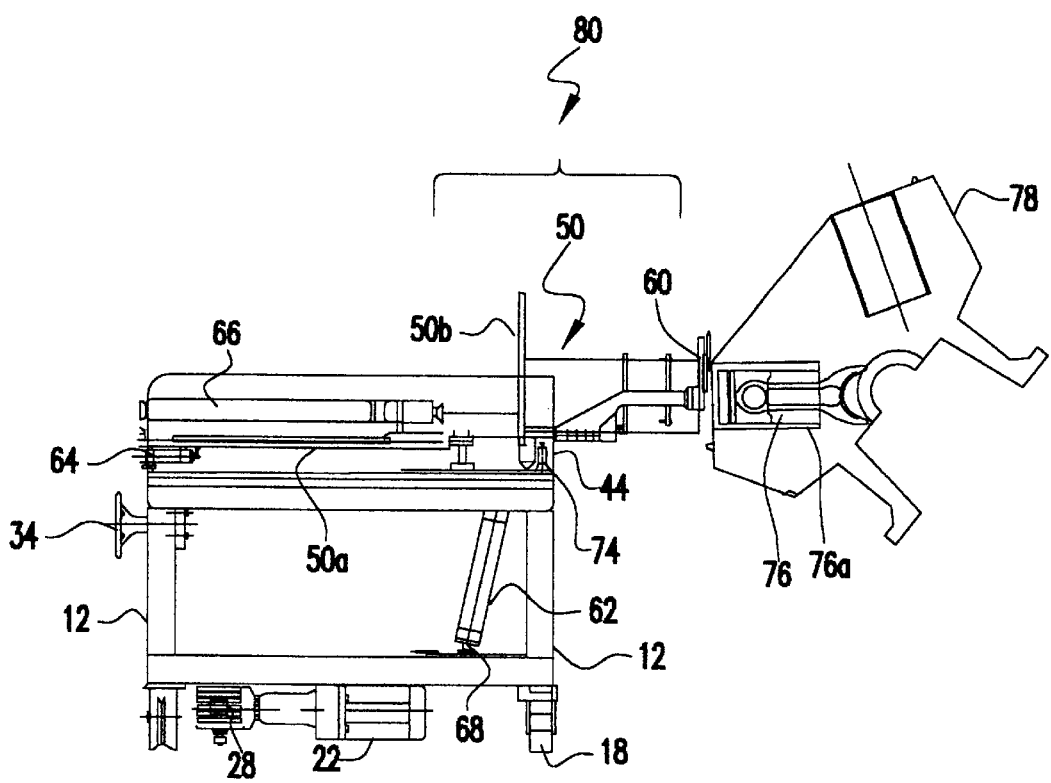
FIG. 6 shows a diagrammatic side plan view of the piston insertion machine when the barrel assembly is in the extended horizontal position and the piston assembly is inserted into a cylinder.

FIG. 6 shows a diagrammatic side plan view of the piston insertion machine 10 when the piston assembly 46 is inserted into the cylinder 76. The component 66 is extended in this figure, and the piston assembly 46 is in the cylinder 76. FIG. 6 further shows the positioning arm 60 in contact with the cylinder 76 or cylinder liner 76a of the engine block 78.

Figure 7A:
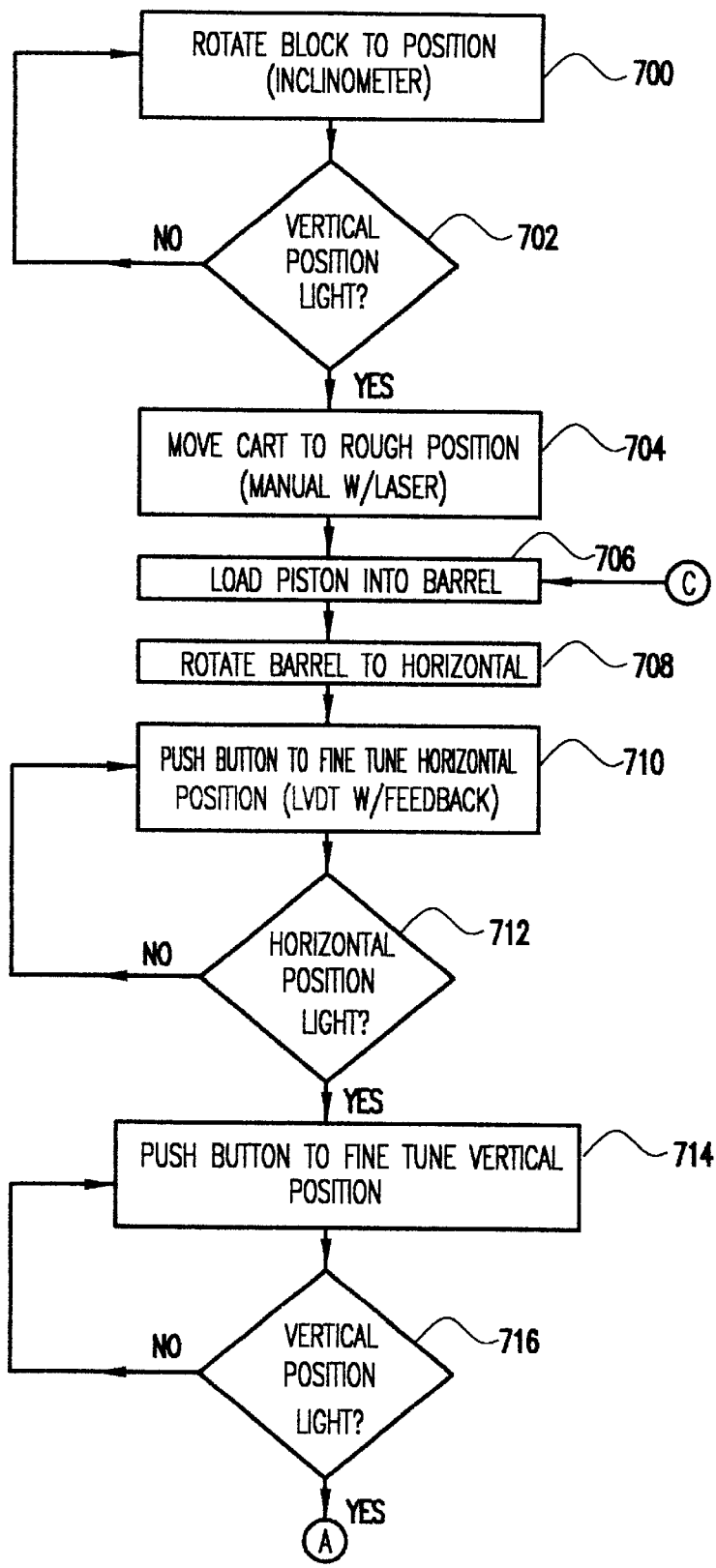
FIGS. 7a–7c show an exemplary flow diagram of a method of inserting a piston assembly into a cylinder of an engine block according to the present invention.
Figure 7B:
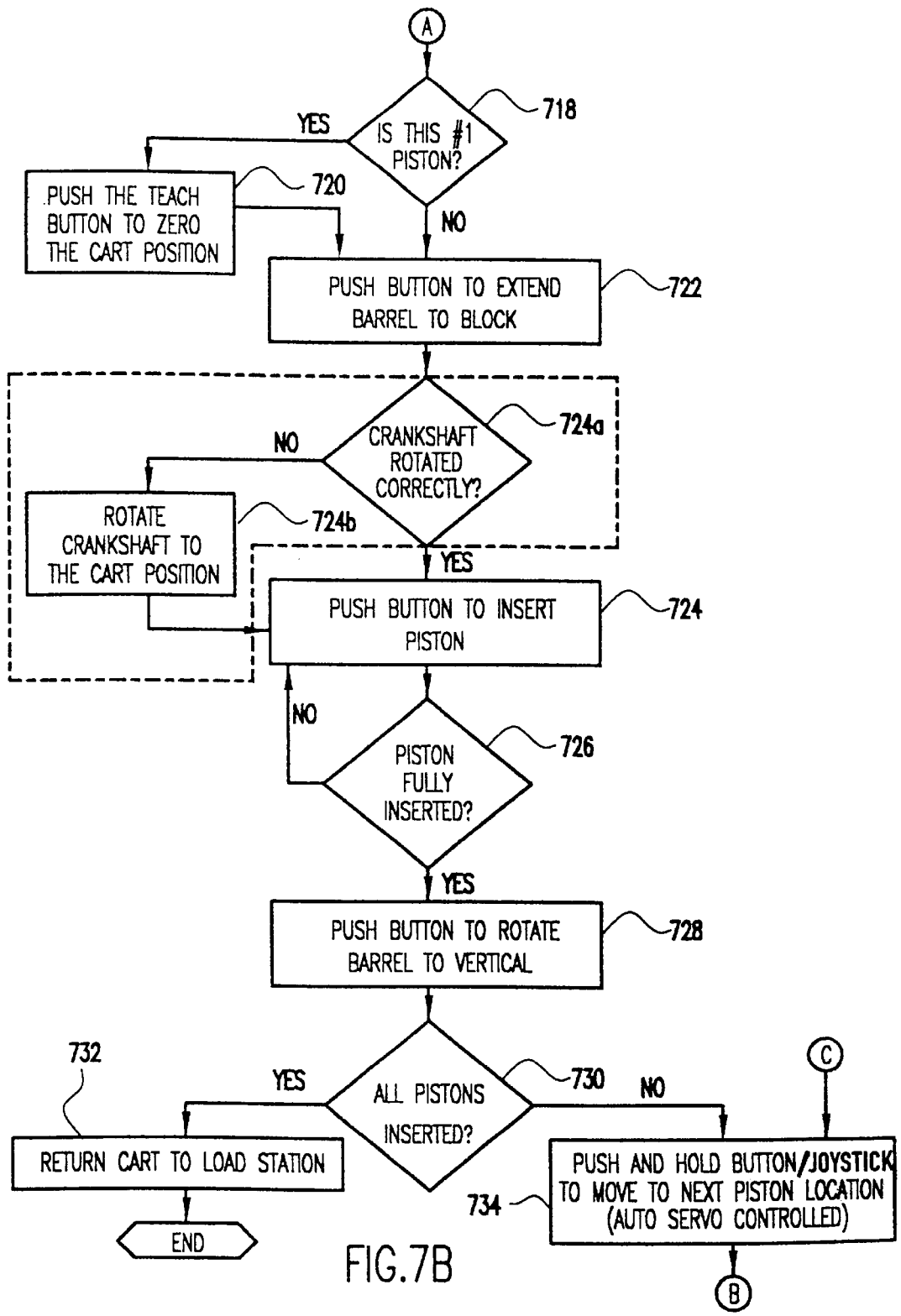
Figure 7C:
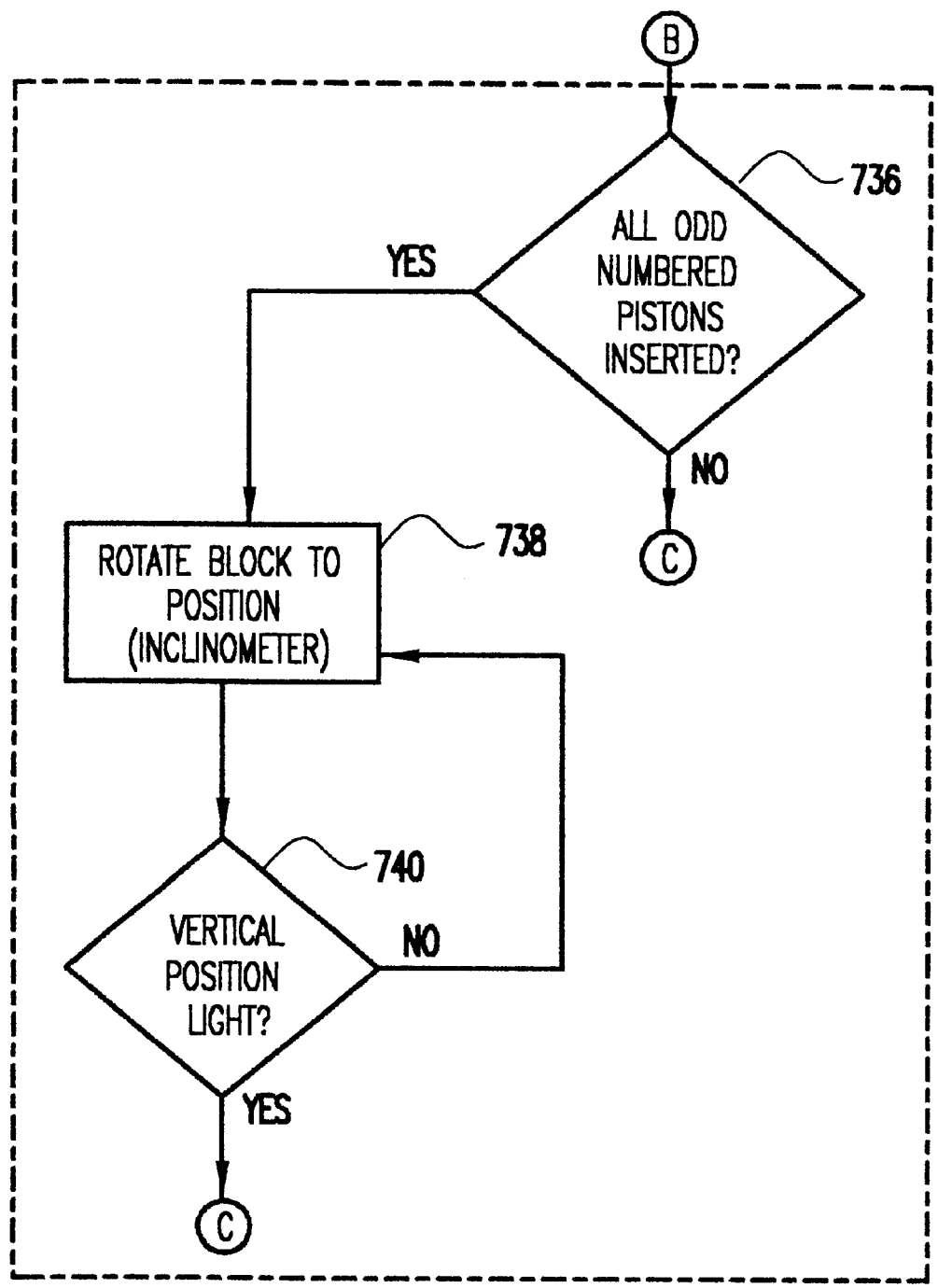

FIGS. 7a–7c show an exemplary flow diagram of a method of inserting the piston assembly 46 into the cylinder 76 of the engine block 78. In use, the engine block 78 is rotated to the perpendicular position at step 700. At step 702, a determination is made as to whether the engine block 78 is properly positioned in the vertical position (e.g., perpendicular). If not, step 700 is repeated. Once the engine block 78 is properly positioned in the vertical position, the piston insertion machine 10 is positioned with the laser spotter 30 with respect to a fixed location on the engine block 78 at step 704. At step 706, the piston assembly 46 is inserted into the barrel assembly 50, and the doors 52 are closed. At step 708, the barrel assembly 50 is rotated from the vertical position of FIG. 2 to the horizontal position of FIG. 3. The rotation of the barrel assembly 50 is accomplished by retracting the component 62.

At step 710, the barrel assembly 50 engages the cylinder liner 76a and the piston insertion machine 10 is set aligned in the horizontal position so that a first piston assembly 46 can be inserted within the cylinder 76. At step 712, a determination is made as to whether the barrel assembly 50 is properly positioned in the horizontal position. If the barrel assembly 50 is not properly positioned, step 710 is repeated. At step 714, the barrel assembly 50 is aligned in the vertical position. If the barrel assembly 50 is not properly positioned, step 714 is repeated; however, if the barrel assembly 50 is properly positioned, a determination is made as to whether this is the first piston assembly 46 (step 718). If this is the first piston assembly 46, then the piston insertion machine 10 is "zeroed" at step 720, and at step 722 the barrel assembly 50 is extended to the engine block 78. At step 724, the piston assembly 46 is then inserted into the cylinder 76 (FIG. 6). This is accomplished by extending the component 66 which, in turn, pushes the piston assembly 46 into the cylinder 76. At step 726, a determination is made as to whether the piston assembly 46 is fully inserted into the cylinder 76 and, if not, step 724 is repeated until the piston assembly 46 is completed inserted within the cylinder 76. Once the piston assembly 46 is fully inserted within the cylinder 76, the barrel assembly 50 is rotated to the vertical position of FIG. 2 at step 728. This is accomplished by retracting the component 64 and extending the component 62, respectively.

At step 730, a determination is made as to whether all of the piston assemblies 46 are inserted within the respective cylinders 76. If yes, then the piston insertion machine 10 is returned to its initial position at step 732. If all of the piston assemblies 46 are not inserted into the respective cylinders 76, then the piston insertion machine 10 automatically moves to the next cylinder 76 at step 734. Steps 706 to 730 are repeated until all of the piston assemblies 46 are properly installed within the respective cylinders 76.

Referring to FIG. 7c, after step 734, a determination may be made as to whether all of the piston assemblies 46 on a first side of the engine block 78 are installed (step 736). If no, then the system will return to step 706. However, if all of the piston assemblies 46 on the first side of the engine block 78 are installed, then the engine block 78 will be rotated at step 738 to the vertical position, and a determination will be made at step 740 as to whether the engine block is in the proper position. If the engine block 78 is not in the proper position, step 738 will be repeated. If the engine block 78 is in the proper position, steps 706 to 736 will be repeated until all of the piston assemblies 46 are properly and fully inserted into the respective cylinders 76 of the engine block 78.

As a further embodiment, between steps 722 and 724, a determination will be made as to whether the crankshaft of the engine is in the correct location (step 724a) and, if not, the crank shaft will be rotated to the proper position at step 724b. It is further noted that the piston insertion machine may be locked in place during any operational stage.

INDUSTRIAL APPLICABILITY

In operation, the piston insertion machine 10 allows an operator to position, align and insert the piston assembly 46 into the cylinder 76 of the engine block 78. First, the piston assembly 46 is inserted within the barrel assembly 50 and the barrel assembly 50 is rotated to the horizontal position via the component 62. An initial position on the engine block 78 is located by the position sensor 30, and the controller 26 then sets the initial position 10 (e.g., "zero" or reference position) as a reference position so that the piston insertion machine 10 may be accurately moved between the cylinders 76 of the engine block 78.

The controller 26 may be pre-programmed with the configuration of several engine blocks so that the piston insertion machine 10 may be positioned to any cylinder 76 on the engine block 78, regardless of the specific configuration or design of the engine block 78. Once the initial position is set, the encoder 28 is now capable of automatically positioning the piston insertion machine 10 to any location on the engine block 78 with reference to the initial position.

The piston insertion machine 10 is locked into place by the interlock system 40 during the setting of the initial position or after the piston insertion machine 10 has been moved to a desired position for insertion of the piston assembly 46 into the cylinder 76. After the initial position is set or the piston assembly 46 is inserted into the cylinder 76, the interlock system 40 disengages so that the piston insertion machine 10 can move to the next cylinder.

The piston insertion machine 10 is capable of moving between the desired positions via the wheels 18. The wheels 18 are driven via the motor 22 and the rack and pinion gear 24, or alternatively manually driven by the drive wheel 34. The manual system may also be used in conjunction with the encoder 28 and position sensor 30 to provide fine adjustments in the positioning of the piston insertion machine 10 prior to inserting the piston assemblies 46 into the respective cylinders 76.

In order to insert the piston assembly 46 into the respective cylinder 76 of the engine block 78, the single piston assembly 46 inserted into the barrel assembly 50 is extended forward by the component 64 and aligned with the cylinder 76. The piston assembly 46 is then slid through the piston ring compressor 54 into the cylinder 76 by the extension of the component 66. In this operation stage, the doors 52 remain closed to ensure that the piston assembly 46 remains within the barrel assembly 50. The barrel assembly 50 is preferably locked into place during the alignment and insertion of the piston assembly 46 into the cylinder 76. This ensures that that the piston assembly 46 remains aligned and thereafter properly inserted within the cylinder 76. Once the piston assembly 46 is inserted into the cylinder 76, the barrel assembly 50 is unlocked and retracted and placed in the upright position so that additional piston assemblies 46 can be inserted therein.

Other aspects, objects and advantages of this invention can be obtained from a study of the drawings, the disclosure and the appended claims.

What is claimed is:

1. A method of inserting a piston assembly into a cylinder of an engine block, the method comprising:

inserting the piston assembly into a barrel assembly;

rotating the barrel assembly from a vertical position to a horizontal position;

aligning the barrel assembly with the cylinder of the engine block; and moving the piston assembly through the barrel assembly into the cylinder.

2. The method of claim 1, including locating an initial position on the engine block prior to the step of aligning.

3. The method of claim 2, including setting the initial position as a reference position after the locating step.

4. The method of claim 3, wherein the aligning step includes moving the barrel assembly from the initial position to a position aligned with respect to the cylinder.

5. The method of claim 1, including:

rotating the barrel assembly from the horizontal position to the vertical position;

inserting a second piston assembly into the barrel assembly;

rotating the barrel assembly from the vertical position to the horizontal position;

aligning the barrel assembly with a second cylinder; and moving the second piston assembly through the barrel assembly into the second cylinder.

6. The method of claim 1, including engaging the barrel assembly with a cylinder liner of the cylinder prior to inserting the piston assembly into the cylinder.

7. The method of claim 6, including locking the barrel assembly in place when the barrel assembly engages the cylinder liner of the cylinder.

8. The method of claim 1, wherein the aligning step includes moving the barrel assembly in a first direction or a second direction and rotating the engine block.

9. The method of claim 8, wherein the step of rotating the barrel assembly is performed by activating the components prior to the step of moving the piston assembly.

10. The method of claim 1, including extending the barrel assembly into contact with the cylinder prior to the inserting step and locking the barrel assembly in the extended position.

11. The method of claim 10, including retracting the barrel assembly from the cylinder after the inserting step.

12. The method of claim 1, including:

determining whether a first piston assembly is inserted within the barrel assembly;

setting a position of the barrel assembly with respect to a first cylinder of the engine block when the determining step determines that the first piston assembly is inserted within the barrel assembly;

inserting a second piston assembly into the barrel assembly after the first piston assembly is moved into the cylinder;

aligning the barrel assembly with a second cylinder by using the first cylinder as a reference position; and moving the second piston assembly into the second cylinder.

13. The method of claim 12, including determining whether all piston assemblies have been moved into respective cylinders after the moving steps.

14. A method of inserting a piston assembly into a cylinder of an engine block using a piston insertion machine, the piston insertion machine including a barrel assembly adapted for housing the piston assembly therein, the barrel assembly being moveable by components, the method comprising:

inserting the piston assembly into the barrel assembly;

rotating the barrel assembly from a vertical position to a horizontal position;

aligning the barrel assembly with the cylinder of the engine block;

extending the barrel assembly to the cylinder; and inserting the piston assembly into the cylinder of the engine block.

15. The method of claim 14, including:

locating an initial position on the engine block prior to the step of aligning; and setting the initial position as a reference position after the locating step.

16. The method of claim 14, wherein the aligning step includes moving the barrel assembly from the initial position to a position aligned with respect to the cylinder.

17. The method of claim 14, including:

rotating the barrel assembly from the horizontal position to the vertical position after the inserting step;

inserting a second piston assembly into the barrel assembly;

rotating the barrel assembly from the vertical position to the horizontal position;

aligning the barrel assembly with a second cylinder;

extending the barrel assembly to the cylinder;

inserting the second piston assembly into the second cylinder; and wherein the extending step includes engaging the barrel assembly with a cylinder liner of the cylinder prior to inserting the piston assembly into the cylinder.

18. The method of claim 17, wherein the aligning step includes at least one of (i) moving the barrel assembly in a first direction or a second direction and (ii) rotating the engine block.

19. The method of claim 17, including retracting the barrel assembly from the cylinder after the inserting step.

20. The method of claim 17, wherein the rotating step and the extending step are performed by activating the components, the activating the components includes:

retracting a first component of the components in order to rotate the barrel assembly into the horizontal position; and extending a second component of the components in order to extend the barrel assembly.

21. The method of claim 17, wherein the inserting step includes extending a third component of the components to insert the piston assembly within the cylinder.

* * * * *